(12) United States Patent
Babicz

(10) Patent No.: US 7,231,872 B2
(45) Date of Patent: Jun. 19, 2007

(54) CHOCOLATE PROCESSING MACHINE

(75) Inventor: Jeffrey M. Babicz, Newburgh, NY (US)

(73) Assignee: Choco Vision Corporation, Poughkeepsie, NY (US)

( * ) Notice: Subject to any disclaimer, the term of this patent is extended or adjusted under 35 U.S.C. 154(b) by 416 days.

(21) Appl. No.: 10/689,583

(22) Filed: Oct. 22, 2003

(65) Prior Publication Data

US 2005/0087078 A1    Apr. 28, 2005

(51) Int. Cl.
*A23G 1/00* (2006.01)
(52) U.S. Cl. ............................ 99/455; 99/348; 99/483; 99/486; 99/517; 366/146; 366/200; 366/221; 366/230
(58) Field of Classification Search .......... 99/326–333, 99/452–455, 348, 485, 486, 483, 467, 470, 99/516; 366/145–147, 279, 314, 200, 231, 366/221, 230; 426/306, 520; 241/101.5
See application file for complete search history.

(56) References Cited

U.S. PATENT DOCUMENTS

| | | | | |
|---|---|---|---|---|
| 1,596,860 | A | * | 8/1926 | Klaus ......................... 426/518 |
| 3,115,821 | A | * | 12/1963 | Hubner .................... 241/101.5 |
| 4,178,105 | A | * | 12/1979 | Sollich ....................... 366/312 |
| 4,706,558 | A | * | 11/1987 | Snyder, Jr. ................... 99/455 |
| 4,802,407 | A | * | 2/1989 | Negri et al. .................. 99/453 |
| 4,907,502 | A | * | 3/1990 | Snyder, Jr. ................... 99/455 |

* cited by examiner

*Primary Examiner*—Timothy F. Simone
(74) *Attorney, Agent, or Firm*—Joseph L. Spiegel; Heslin, Rothenberg, Farley & Mesiti, P.C.

(57) ABSTRACT

A chocolate tempering machine is digitally programmable for controlling the heating, cooling and rotation within the machine. The machine may be programmed to enable agitated, liquid chocolate to retain its proper viscosity for extended periods of time as well as minimizing the amount of porosity in the final product and by controlling bowl rotation length of time, as well as automatically increasing heat at given timed intervals. The machine includes a menu program, whereby a user can adjust and save up to twenty-six different temperature menus or more. This menu program can also be accessed to set and save desired cool down temperatures. Sensors are located such that ambient air and relative humidity can be sensed and audio/visual warnings are provided to the user when these conditions must be altered. A wear-resistant ring for leveling purposes for the machine's bowl also serves to prevent contamination of the interior of the machine. Software adjustment is permitted to select either 110v or 220v operation. A visual feedback real-time clock display is provided to the user corresponding to a specific timed software function. The machine is also provided with a data port for interfacing with external computer-programming units.

11 Claims, 10 Drawing Sheets

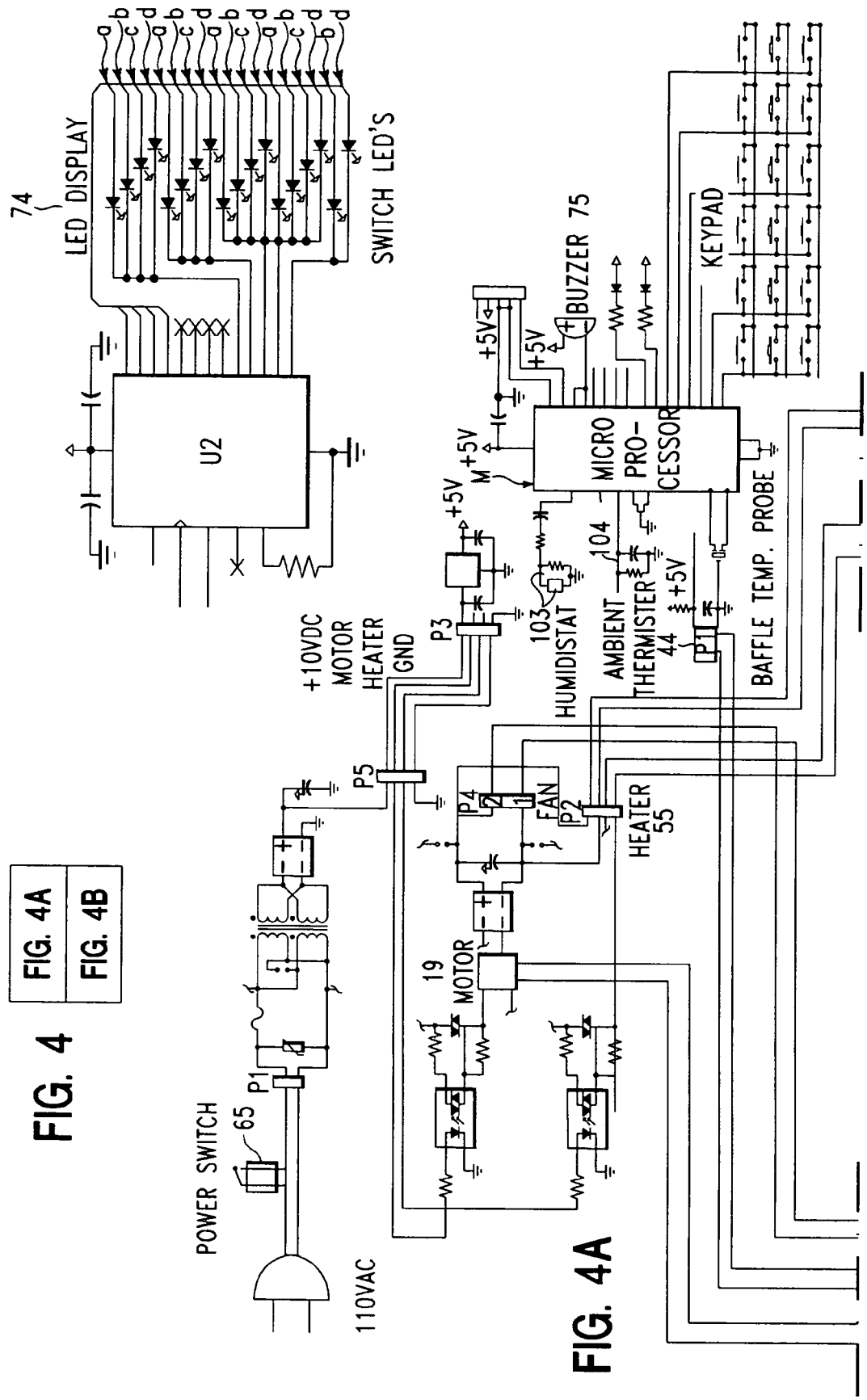

_Probe_Avrg, 006h, T1
  SUB?WWW    _Probe_Avrg, T1,_Probe_Avrg
  ADD?WWW    _Probe_Avrg, _Probe_Avrg
  NEXT?BCL    _Index, 001h, L00333
  LABEL?L L00334
  SHIFTR?WCW   _Probe_Avrg, 006h,_Probe_Value
  CMPGT?WCB   _Probe_Value, 040h, T1
  CMPLT?WCB   _Probe_Value, 003C0h, T2
  CMPLE?WCL   _Probe_Value,
  SUB?WCW    _Probe_Value, _Delta
  MUL?CWW    00Ah, _Delta, _Delta
  SUB?CWW    0037Ah, T1, _Probe_Temp
  SUB?CWW    00200h, _Probe_Value, _Delta
  MUL?CWW    00Ah, _Delta, _Delta
  DIV?WCW_Delta, 006h, T1
  ADD?CWW    0037Ah, T1, _Probe_Temp
  MOVE?CB    _PROBE_FAULT, _Fault_Type
  SHIFTR?WCB   _Xword, 002h, _Ambient_Value
  CMPNE?BCL   _Ambient_Warning, 000h, L00341
  CMPLE?BCL   _Ambient_Value, _MAX_AMBIENT_AIR_
L00343
  MOVE?CB    _LOW_AMBIENT, Ambient_Warning
  GOSUB?L_BeepCMPGE?BCL _Ambient_Value,
_MIN_AMBIENT_AIR_VALUE, L00345
  MOVE?CB
  GOSUB?L_Beep
  GOSUB?L_Display_Bar_ScaleCMPEQ?BCB
_Ambient_Warning, _LOW_AMBIENT, T1
  CMPLT?BCB   _Ambient_Value, 08Eh, T2
  LAND?BBW   T1, T2, T2
  CMPEQ?BCB_Ambient_Warning, _HIGH_AMBIENT, T3
  CMPGT?BCBAmbient_Value, 06Ah, T4
  LAND?BBW   LOR?WWW    T2, T4,

| | |
|---|---|
| CMPF?WL | T4, L00347 |
| LABEL?L_Turn_On_Timer | |
| CMPLE?BCL | _Minutes, 000h, L00349 |
| CMPNE?WCL | _Seconds, 000h, L00351 |
| MOVE?CW | 03Ch, _Timer |
| SUB?BCB_Minutes, | 001h, _Minutes |
| CMPGT?WCB | _Timer, 000h, T1 |
| CMPLT?WCL | _Timer, 00100h, T2 |
| RETURN?LABEL?L | _Update_Timer |
| CMPGT?WCB | _Timer, 000h, T1 |
| CMPGT?BCB | _Minutes, 000h, T2 |
| LOR?BBW | T1, T2, T2 |
| SUB?WCW | _Timer, 001h, _Timer |
| CMPNE?WCL | _Timer, 000h, L00359 |
| CMPLE?BCL | _Minutes, 000h, L00361 |
| SUB?BCB_Minutes, | 001h, _Minutes |
| MOVE?CW | 072h, _Timer |
| CMPEQ?BCB | _Run_State, _BOWL_PAUSE, T1 |
| CMPEQ?BCB | _Run_State, _AUTO_PAUSE, T2 |
| LOR?BBW | T1, T2, T2 |
| CMPF?WL | T2, L00363 |
| GOSUB?L_Display_Pause_Time | |
| CMPEQ?BCB | _Heat_Type, _READY, T1 |

FIG. 9

CHOCOLATE PROCESSING MACHINE

BACKGROUND OF THE INVENTION

1. Field of the Invention

This invention relates to a chocolate processing machine, and, in particular, to a machine for melting and tempering chocolate.

2. Description of the Prior Art

U.S. Pat. Nos. 4,706,558 and 4,907,502 disclose home chocolate processing apparatus.

A disadvantage with the utilization of prior art equipment is that many users do not have experience in tempering chocolate and are not familiar with the science of same with the result that mixed results are achieved when using prior art equipment.

Accordingly, a primary object of the present invention is a chocolate processing machine with digital, programmable means for controlling the machine that is more user friendly, resulting in a truly automatic machine.

Another object is such a machine that minimizes the number of decisions a user must make to operate the machine.

Another object is such a machine with audio and visual prompts to alert the user to the next operating cycle.

These and other objects of the present invention are accomplished in accordance with the present invention, one illustrative embodiment of which comprises a chocolate tempering machine that includes digital, programmable means for controlling the heating, cooling and rotation within the machine. In this way the machine is more user friendly resulting in a truly automatic machine and minimizes the number of decisions a user must make to operate the machine. For example, the machine may be programmed to enable agitated, liquid chocolate to retain its proper viscosity for extended periods of time as well as minimizing the amount of porosity in the final product and by controlling bowl rotation length of time, as well as automatically increasing heat at given timed intervals.

The machine is provided with a menu program, whereby a user can adjust and save up to twenty-six different temperature menus or more. This menu program can also be accessed to set and save desired cool down temperatures.

Machine sensors are located such that ambient air and relative humidity can be sensed and audio/visual warnings are provided to the user when these conditions must be altered.

The machine is provided with a wear-resistant ring for leveling purposes for the machine's bowl while at the same time serving to prevent contamination of the interior of the machine.

The machine's temperatures can be adjusted in small increments to accommodate for the correct temperature cycles for a wide variety of chocolate processing scenarios.

Software adjustment is permitted to select either 110v or 220v operation.

True automatic chocolate tempering can be achieved through the selection by the user of only two keystrokes through the use of a single select button.

A visual feedback real-time clock display is provided to the user corresponding to a specific timed software function.

The machine is also provided with a data port for interfacing with external computer-programming units.

BRIEF DESCRIPTION OF THE DRAWING

Other objects, features and advantages of the invention will become apparent from the following description and accompanying drawing, wherein.

DETAILED DESCRIPTION

Figure 1:
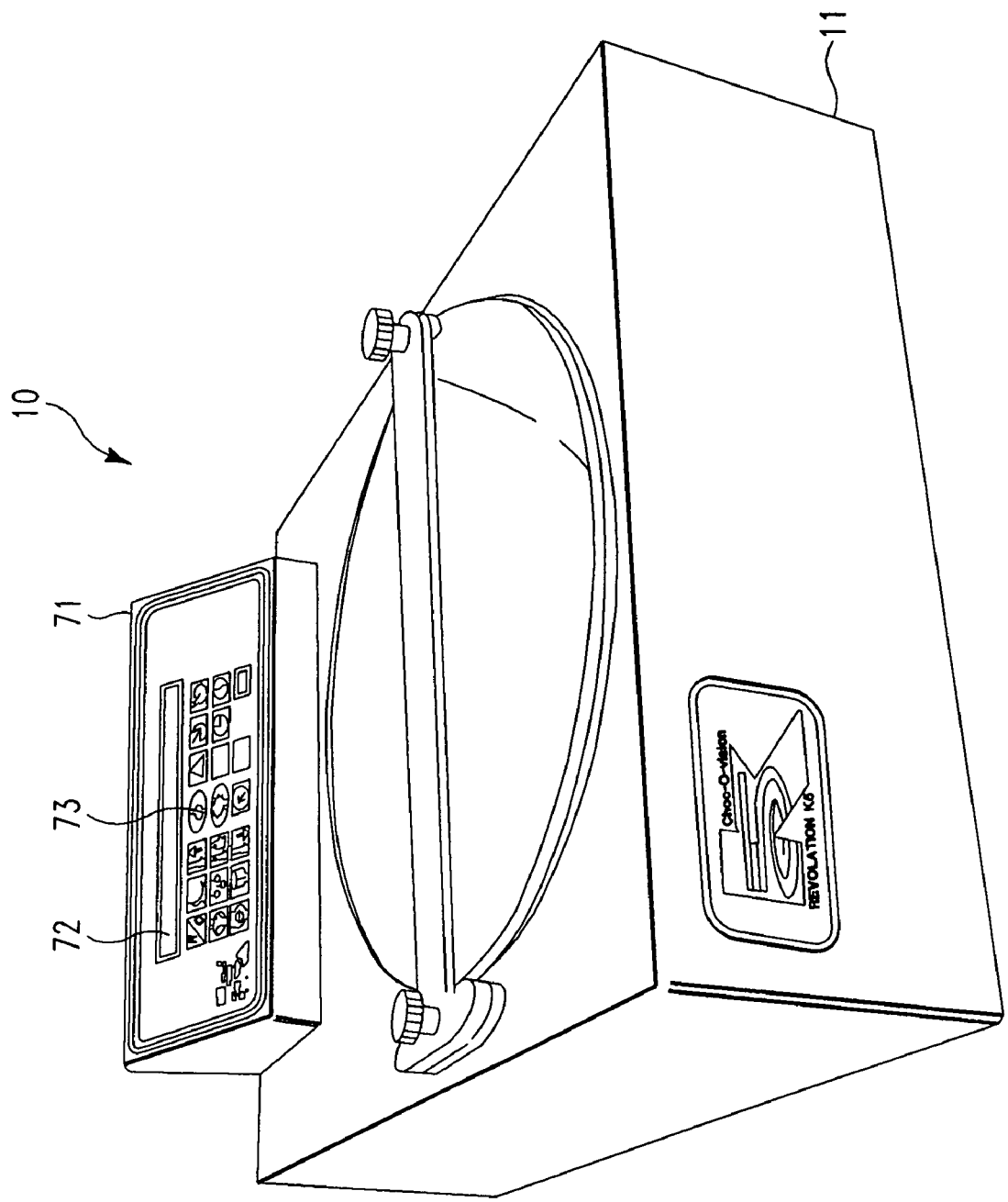
FIG. 1 is a perspective view of the chocolate processing machine of the present invention.

Referring now to FIG. 1 of the drawing, the chocolate tempering machine 10 of the present invention is seen as including a casing 11, on or within which, all major components of the machine are found.

Figure 2:
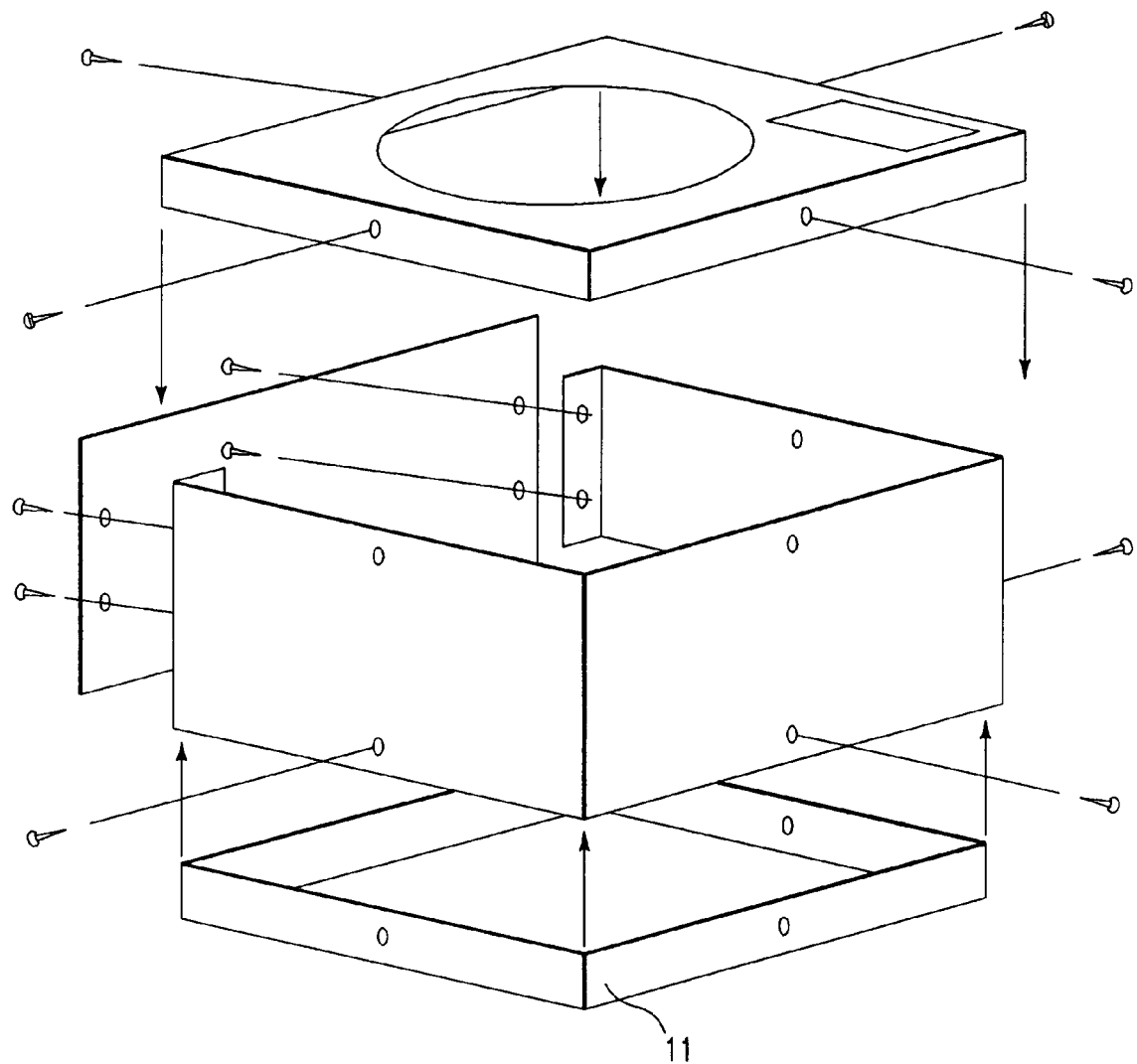
FIG. 2 is an exploded view of the casing for the chocolate processing machine.

An exploded view of the casing 11 is found in FIG. 2. As shown, it is a metal steel housing with a series of break bends and assembly fasteners, thus eliminating welding, grinding and re-finishing. This type casing construction minimizes original manufacturer expenses as well as assemblage expenses.

Figure 3:
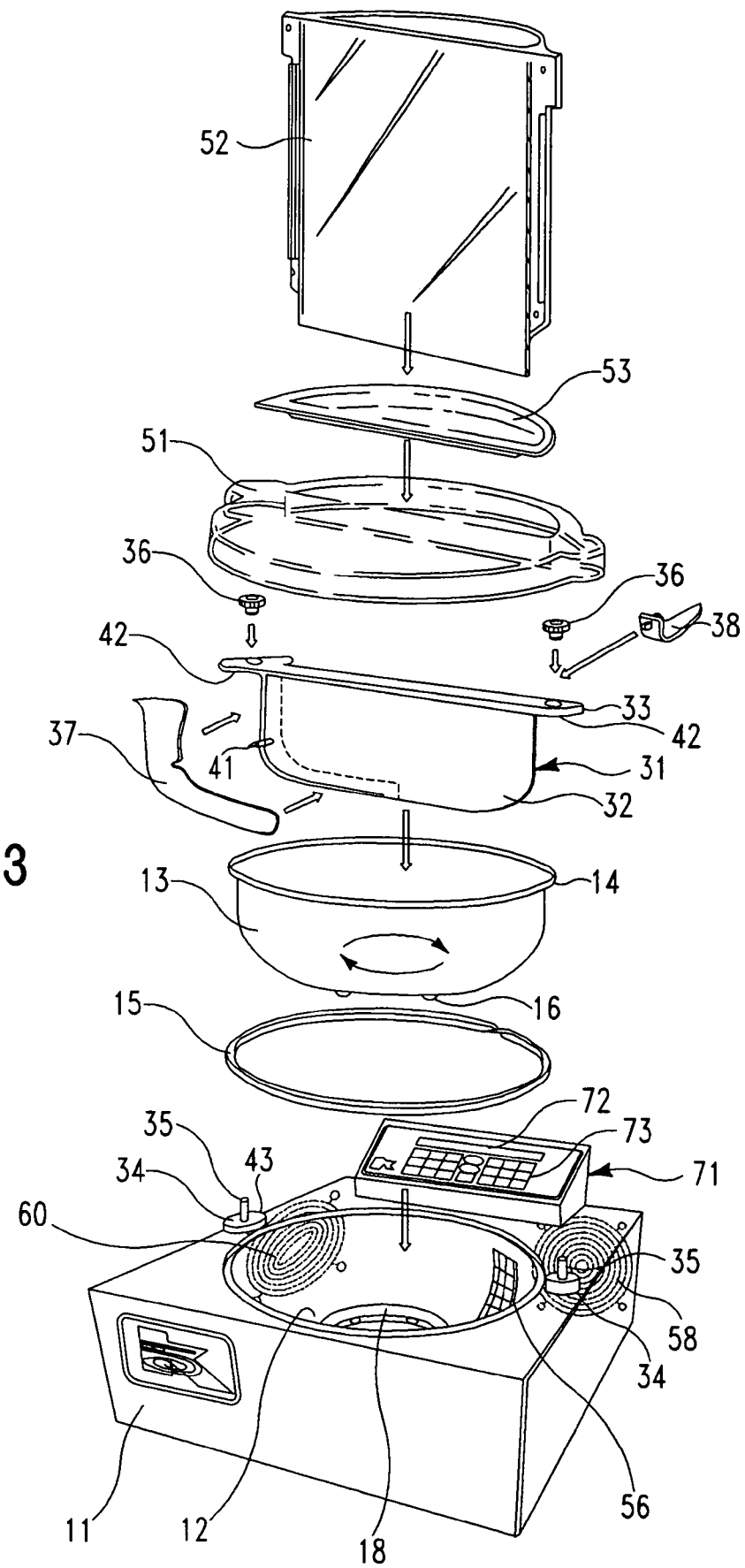
FIG. 3 is an exploded view of the machine hardware.
Figure 4B:
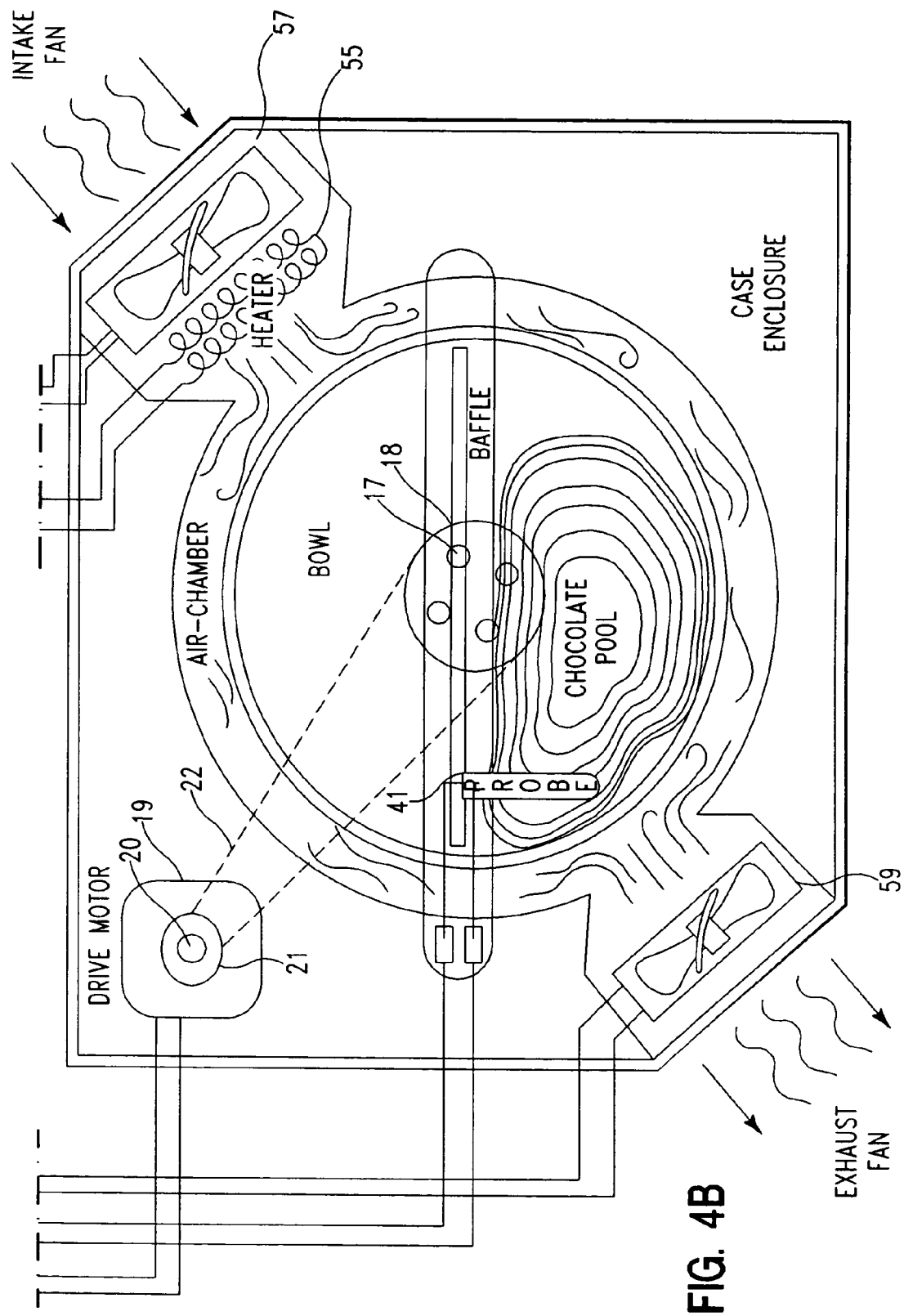
FIG. 4 comprising FIGS. 4A and 4B includes a schematic view and a top view of the machine of the present invention.

Referring to FIGS. 3 and 4, the casing 11 is provided with a cavity 12 for receipt of a bowl 13 as of stainless steel with a lip 14. A wear-resistant plastic ring 15 fits around the casing cavity opening and sits beneath the bowl lip 14 when inserted into the cavity 12. The ring 15 functions as a self-stabilizing/self-leveling device, thus ensuring consistent bowl spinning in the machine while serving to prevent contamination from the external environment. The bowl ring also acts as a liquid chocolate seal, preventing accidental overflowed chocolate from seeping under the bowl area and into the machine internal mechanism.

The bowl is provided at its bottom exterior with locator pins 16 that nestle and lock into similarly positioned depressions 17 in a bowl coupler 18. In this manner the bowl may be temporarily locked into position when the bowl is rotated. When not in use, the bowl is easily disengaged from the bowl coupler.

The bowl coupler 18 is driven by a small fractional horsepower gear motor 19, having a shaft 20 with sprocket 21 that engages a toothed drive 22. The drive 22 in turn is linked to a sprocket (not shown) on the bowl coupler 18. In this manner rotational forces may be applied to the bowl.

The machine 10 is provided with a baffle 31, as of injection molded plastic material. The baffle comprises a vertical sheet 32 and a top elongated horizontal member 33 of the same material, integral therewith. Agitation of a melted chocolate pool is accomplished through the combined action of the stationary baffle 31 and the rotation of the bowl 13.

The upper surface of the casing 11 is provided with a pair of baffle mounts 34 including upward projecting threaded studs 35. The studs are positioned to pass through openings in the ends of the horizontal member 33. The baffle is secured in place on the casing by tightening knobs 36 onto the studs 35. When so secured the baffle also serves to maintain the lateral position of the bowl by engaging the bowl rim.

A scraper 37 is secured to the leading edge of the baffle 31 and serves to scrape melted chocolate from the inner surface of the bowl into a molten pool of chocolate in front of the baffle.

A clip 38 is secured to the back-side of the baffle. At the point when solid chocolate is being introduced into the bowl, this helps to prevent solid chocolate from climbing out of the bowl.

A temperature probe 41 extends outwardly of the front side of the baffle 31. It is a metal shell housing bonded internally to the baffle. Two conductor wires travel through a channel inside the baffle and are soldered to flat connector contacts 42 on the underside of either end of the member 33. When the baffle is secured in place these contacts 42 in turn will make contact with casing contacts 43 on the upper surface of the baffle mount 34, thereby completing a circuit to a temperature sensing circuit 44 on a PC board mounted within the casing 11.

The casing has a top cover 51 that is simply placed over the casing cavity and the baffle mounts and has an opening for receipt of a hopper 52 (to be described hereafter) and a lid 53 which slips into and over the cover opening when the hopper is not in place.

The machine 10 is provided with the vertical hopper 52 for feeding block solid chocolate into the bowl 13 by placing the hopper 52 through the opening in the cover 51. The hopper comes to rest on the top of the cover. The hopper allows a user to pre-load larger quantities of solid chocolate into the machine. The larger quantity of solid chocolate is more than the machine can store by itself during the melting process. Melting is initiated once the hopper assembly is filled with solid chocolate. As the chocolate melts in the machine, the solid chocolate passes down through the hopper 52 and collects in a liquid pool in the machine's bowl 13. Once the desired amount of melted chocolate is achieved, the hopper is removed from the machine and the lid 53 placed over the cover opening.

Within the interior of the casing a heater 55 is mounted, having an outlet 56 for directing heat towards the bowl 13.

An intake fan 57 draws ambient air into the casing 11 through inlet 58, while an exhaust fan 59 draws heated air out of the casing interior through exhaust fan outlet 60.

As heated air leaves the heater and passes through the outlet 56, it comes in contact with the back of the bowl. A heated air chamber is created between the back of the bowl and the shroud of the machine. After contact with the bowl the air is then drawn out through the opening around the bowl coupler and exhausted out of the machine via the exhaust fan through outlet 60.

A power switch 65 mounted on the rear of the casing turns power on to the machine.

A console 71 (FIG. 1) with an alphanumeric display window 72 in its upper portion and keypads in the lower portion monitors and controls the operation of the machine through a microprocessor M and is mounted over an opening leading into the interior of the casing.

In the alphanumeric display window 72, different data will be displayed, depending on the keypad actuated in the lower section.

The lower portion of the control console includes an opening with a printed circuit board (not shown) mounted within the console just beneath the opening on which the keypads are mounted and a function overlay 73 over the console opening. The overlay 73 is a matrix of symbols or pictographs, each of which is mounted over a button on the PC board. When a user presses down on a symbol or pictograph a button beneath an overlay symbol is depressed to activate a particular function of the machine.

The overlay 73 is a smooth, adhesive backed, waterproof, wear-resistant keypad cover that is affixed to the surface of the control console 71. It is easily maintained for cleaning purposes but flexible enough to be able to activate the underlying buttons. The overlay 73 is also translucent to permit illumination from beneath. (Note: All keypads or buttons mentioned are shown generally in the FIG. 4A schematic where the legend KEYPAD appears).

This keypad artwork is displayed in symbol form for universal recognition. The symbols represent crucial intervals throughout each of the automatic cycles. Throughout the automatic cycles of the machine, a visual key illumination is provided to the user by means of LEDs 74 mounted on the PC board and behind the buttons. (Note: All means of illumination mentioned are shown generally in the FIG. 4A schematic where the legend LED DISPLAY appears). Once predetermined timed or temperature points are reached, specific buttons are illuminated (with or without audio signals) that prompt the user to advance to the next stage of automatic tempering. An audio signal is emitted from a beeper or buzzer 75 mounted on the PC board, when electrically actuated.

Figure 5A:
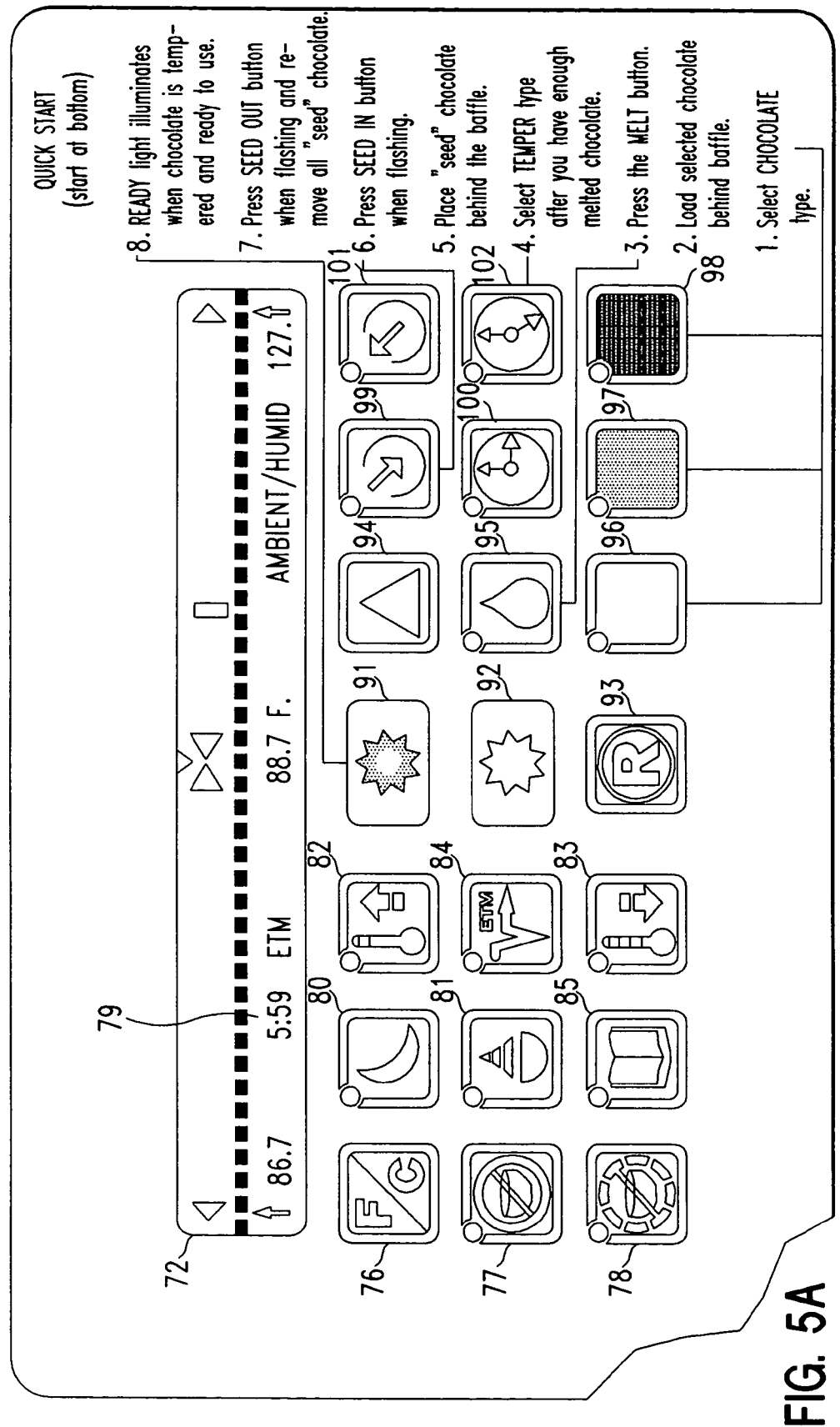
FIGS. 5A and 5B are top views of the console's display window and matrix of symbols or pictographs of the controls for the machine, FIG. 5A showing the display window in its normal mode when doing standard tempering, for example, and FIG. 5B showing the display window when using the menu save feature.
Figure 5B:
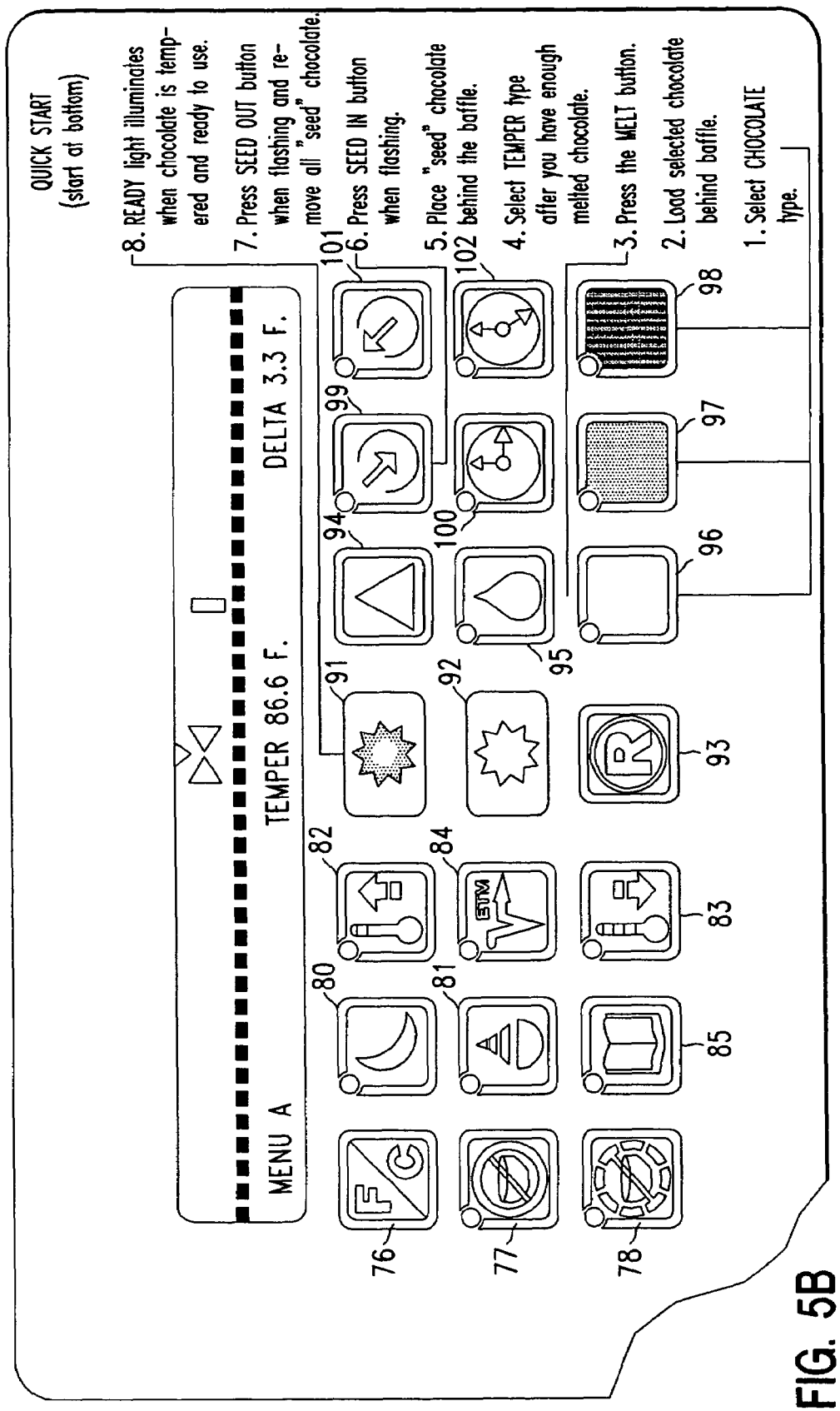

Referring to FIGS. 4 and 5A and 5B, the matrix includes a Fahrenheit/Celsius keypad 76. Before starting the melting process the user can press the F/C button which will display the temperature in either Fahrenheit or Celsius within the display window 72. This can be selected at any time during operation of the machine and converts the actual temperature 'on the fly'.

Actuation of the pause keypad 77 will stop the rotation of the bowl for a short period of time, say 90 seconds. Once selected, the display window switches from the temperature read-out to a timed counter from 90 seconds to 00. When 00 is reached, rotation resumes automatically or the pause keypad 77 can be depressed again to restart the pause cycle.

An auto pause keypad 78 allows a user to select custom pause settings. The machine automatically loops between the selected pause settings and a pre-set automatic agitation cycle. Once pressed and held down, the display from a time counter 79 (FIG. 5A) appears in the display window and begins to scroll down from say, 2:00 to 3:00 and so on up to 8:00. (A written code embedded within the microprocessor M enables the count-down in specific increments.) For example, if the user wants to stop the rotation of the bowl for five minutes he will hold the auto-pause button down until 5:00 is reached. At this point the bowl will be paused for five minutes (allowing for delicate items to be dipped in the tempered pool of chocolate without the disturbance of the agitation of the chocolate) and the display will count down from 5:00 to 0:00. At this time the machine will automatically resume its previous state (including rotation and temperature control) for two minutes. After two minutes the machine will begin the user programmed auto pause cycle all over again. This will continue as long as the auto pause is activated. To deactivate, the auto pause button 78 is pressed once.

Actuation of the overnight mode button 80 holds the pool of chocolate at a predetermined temperature, for example, 95 F./35.0 C. while rotation of the bowl is stopped.

Actuation of the drip feed keypad 81 holds the chocolate at a predetermined temperature (typically 93 F./33.8 C.) to allow for traditional methods. During this cycle bowl rotation is normal. It allows the user to drip-feed pre-melted chocolate into the machine. Once the drip-feed button is pressed, the pool of chocolate is maintained at a predetermined temperature.

In the melt mode, the +heat keypad 82 increases a temperature setting by 1 F. In the temper or ready mode actuation of the keypad increases temperature setting by 0.1 F.

There are incremental selections with each keystroke, or rapid scroll with the button fully depressed. The degree of change is displayed below the temperature. The +heat button can be pressed and held down in order to increase the machine's temperature within the bowl. When the +heat button is held down, the temperature display (FIG. 5A) changes to a new target temperature until the user stops at the desired temperature. Since heat is being added, the heater 55 will turn on. The user then releases the +heat button and the temperature display will revert to the real time temperature of the liquid pool of chocolate while the machine adjusts to the desired temperature. The temperature range of adjustment is 80–130 F. The –heat keypad 83 functions similarly to the +heat keypad button 82 allowing for temperature decreases.

The ETM (extended temper mode) keypad 84 allows the chocolate to remain in the bowl for extended periods of time (up to 10 hours) without thickening, through automatic intervals of bowl pauses and patterns of heat bursts. When actuated, the ETM switch 84 becomes illuminated and ETM appears in the display. The machine will agitate for a preset time interval such as five minutes. At the end of this time period the machine motor 19 stops, with the heater 55 on, still controlling the liquid pool of chocolate for a preset period of time such as ten minutes. At the end of this ten minute period, the motor 19 will start rotation of the bowl 13, the temperature display will freeze and the heater will heat the liquid pool of chocolate to a preset temperature such as by a 1.8 F increase. By freezing the display, the user has no knowledge of the hidden, proprietary target temperature. By increasing the temperature at this point, additional seed chocolate is dissolved off and corrects the chocolate's viscosity. Once the target temperature is reached, the display will revert to real time temperature. The machine will again agitate for five minutes, stop rotation for ten minutes, etc. This cycle will continue as long as ETM is activated. It is a written portion of code programmed within the microprocessor M that senses temperatures, programs temperature changes and selects time intervals for rotation so that this feature of the machine can be utilized.

The menu save keypad 85 allows a user to save custom melt or temper temperatures and recall them at a later date. The menu saved is accessed by selecting the menu button 85.

A data field appears in the display (FIG. 5B), showing three usable programmable parameters (Data Field, Temper Set Point, Delta Cool Down). All three are adjusted using the +heat and –heat buttons.

With the Data Field selector, (indicated when used by a flashing 'A' to the far left in the display window), the user can scroll A–Z and change the temper set point temperatures and Delta cool down temperatures for each of the corresponding Data Field (A–Z or temperature 'recipes'). To change from one Data Field to another, the user will press and hold down the desired +heat 82 or –heat button 83 until the user scrolls to the desired Data Field (A–Z). Once there, the user selects the Temper 1 button to change the temper set point. Once the Temper 1 button is pressed, the center parameter prompts the user by flashing in the display. This parameter can now be changed for that Data Field by pressing and holding down the desired +heat or –heat button and scrolling to the desired temperature. The user can also adjust the Delta Cool Down by pressing the Temper 2 button and the Delta parameter will flash on the far right of the display. The user can now scroll to the desired temperature by pressing and holding down the +heat 82 or –heat button 83. Once any custom menu Data Field has been altered the change is saved in the machine's memory to be recalled later. To access a custom 'temperature recipe' at a later date, select the Menu button 85 and scroll through to the desired Data Field (A–Z). Once there, the user can simply press the melt button and the custom parameters will be utilized for that chocolate batch. It is a portion of code programmed within the microprocessor M to save a number of temperature settings and recalling them later so that this feature of the machine can be utilized.

The ready symbol 91, when illuminated, indicates that chocolate is tempered, done by measuring the temperature of the pool of chocolate via the heat probe.

The heat light symbol 92, when flashing, indicates that the heater 55 is on.

The reset keypad 93, when actuated, stops the machine and returns to the default settings.

The triangular shaped symbol keypad 94 is a spare button in case an additional feature is added to the machine.

Actuation of the melt button 95 starts rotation of the bowl 13, turns the heater on and melting of the chocolate begins.

All of the previous four features, 91–93 and 95, operate in accordance with a code programmed into the microcomputer M.

The white 96, milk 97 and dark 98 keypads set the machine to the desired chocolate type to temper. These keypads are color-coded and correspond to the specific automatic chocolate cycles. The user will select the desired chocolate-type button. Once activated, the LED associated with the button will illuminate, marking the beginning for the machine's automatic melting and tempering cycle. The heater 55 and associated heater light will also be activated beginning the melt cycle and the temperature display will read the actual temperature of the liquid pool of chocolate. It is pre-set temperatures embedded in code within the microprocessor M that activate the given cycles for white, milk and dark chocolate tempering.

The seed-in keypad 99 is an auto-prompt indicating that seed chocolate needs to be added. Seed chocolate is any quantity of known tempered chocolate. Seed chocolate is introduced into the liquid pool of chocolate in order to transfer proper seed crystals. Once a small quantity of crystals is transferred, they reproduce automatically and very quickly. In effect, the seed chocolate jump-starts the tempering process. The microprocessor is signaled to go to the next section of code for activation of this feature of the machine.

The temper keypad 100 stops the full heat mode of the melting process and begins the automatic tempering cycle, again in response to a portion of code.

The seed-out keypad 101 is an auto-prompt indicating that any remaining seed chocolate needs to be removed. The final auto-tempering cycle is initiated and the display switches to 0.10 F. (0.05 C).

The long temper keypad 102 functions similarly to the temper keypad but provides a long tempering cool down cycle for hard temper chocolates. The low cool point curve is lower than the temper set point.

Figure 6:
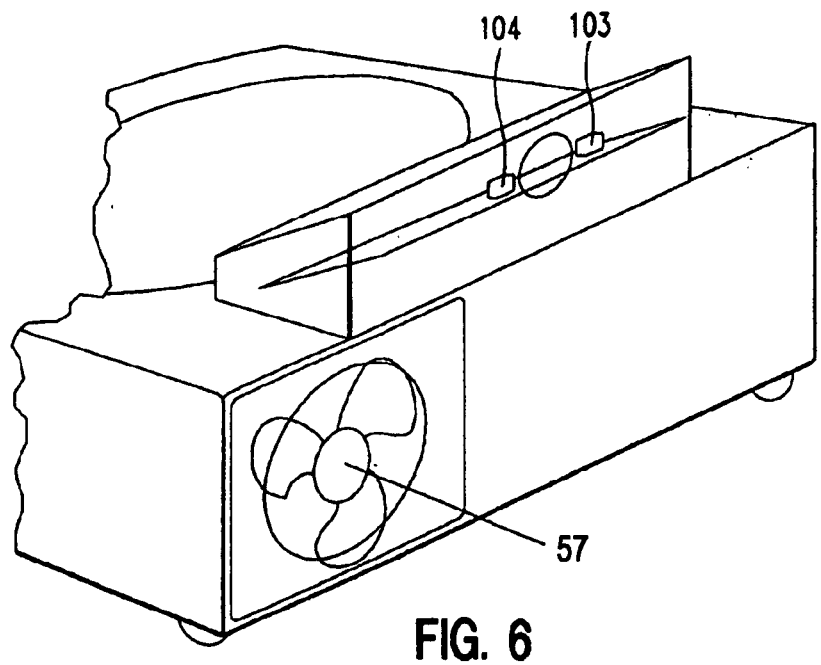
FIG. 6 is a perspective view, partially diagrammatic and partially broken away of a portion of the rear of the machine, illustrating the location of the machine's relative humidity sensor and ambient air sensor.
Figure 7:
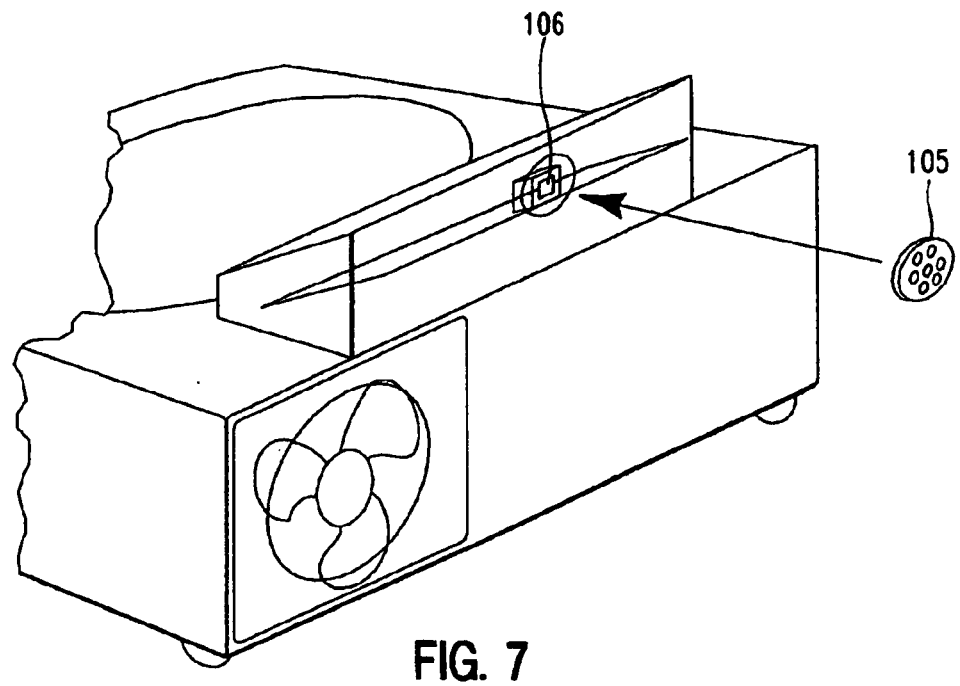
FIG. 7 is a perspective view, partially diagrammatic and partially broken away of a portion of the rear of the machine, illustrating the location of the machine's data port; and, FIGS. 8 and 9 illustrate a code example for programming the machine.

Referring to FIGS. 4, 6 and 7, the machine 10 is provided with a relative humidity sensor 103, as, for example, manufactured by Ohmic and an ambient air sensor 104 such as manufactured by Phillips. The relative humidity sensor 103 senses average room relative humidity, by reading the air moving through the vented plug 105 located on the back of the machine, while the ambient air sensor, in a similar fashion, senses average room temperature. These sensors are mounted on the PC board that is mounted within the control console. Parameters are built into the code. Once a sensor is above or below the parameters, an audio/visual warning will be provided to the user indicating that conditions must be altered in order to provide the best atmospheric conditions for processing chocolate. The warnings are turned off once conditions are properly adjusted.

Referring to FIG. 7, a manufacturer/user data port 106 is available through the removable plug 105. The data port is used for interfacing with external computer programming units. Software alterations can be provided to the machine's source code such as new software version releases, custom software provisions for new customers, software glitch patches, as well as, but not limited to, interfacing with external monitors, printers, computers and calibration equipment.

A cleaning brush (not shown) is provided for the user as a means for cleaning areas of the machine and its components that come in contact with what may otherwise be difficult to clean.

In operation the machine 10 is plugged into an appropriate grounded circuit and the power switch 65 is turned on. Chocolate is loaded behind the baffle 31 and up to 10 pounds of solid block pieces can be loaded if using the hopper.

The white 96, milk 97 or dark 98 chocolate keypad is selected and actuated.

Rotation of the machine is started by depressing the melt button 95. As the chocolate begins to melt, it will collect in a pool in front of the scraper 37 near the probe 41. Depending on room conditions it will take approximately 45 minutes to melt 10 pounds of chocolate. If the chocolate being tempered requires a higher or lower melt temperature, the user can press the +heat 82 or −heat 83 keypad. Every touch of these buttons changes the temperature setting 1 F./(2 C.).

When the desired amount of chocolate is melted the temper keypad 100 is actuated and will flash and beep or buzz. The heater 55 and its associated light are turned off, allowing the user to go into a temper and cool down cycle. The user is prompted to add seed chocolate behind the baffle, 8 oz. per 10 lb. batch. If the seed chocolate to be used is not in good condition, the long temper button 102 is actuated instead. Then the user acknowledges this by pressing the seed-in auto alert button 99. Depending on room conditions, the tempering cycle takes 10–15 minutes.

The long temper adds an additional cooling period. By selecting the long temper button 102, the temperature is allowed to drop an additional predetermined number of degrees before the heater 55 and its associated light becomes activated raising the temperature of the liquid pool of chocolate to its temper set point. This additional cooling cycle induces additional seed production in the pool of chocolate, insuring a good temper.

Once the proper temperature is achieved, the seed-out auto alert button 101 will sound. Any remaining seed chocolate is removed by the user from behind the baffle and the seed-out button is pressed to acknowledge.

When the final stages of tempering are complete, the machine will sound three long beeps and the ready keypad 91 illuminates. The chocolate is now tempered and ready for use.

These auto-prompts are software coded, based on specific temperature parameters and are well within the knowledge of an artisan skilled in the art. Representative software coding is found in FIGS. 8 and 9. These are very small snapshots of what the code looks like (written in Basic).

The machine's extended temper mode can be activated by pressing the ETM keypad 84. The extended temper mode allows chocolate to remain in the bowl for extended periods of time (up to 10 hours), without thickening and does so through automatic intervals of bowl pauses and patterns of heat bursts.

Once ETM is activated, ETM is displayed in the window. Bowl rotation will stop and start in specific intervals in the melt as well as both temper modes. Before the bowl resumes its rotation while in the ETM mode, the entire display window will flash for 15 seconds. The ETM cycle is de-activated by depressing the ETM keypad 84 again. This will bring the machine back to standard bowl rotation and heat control.

The machine's overnight mode permits users to leave melted chocolate in the bowl overnight for saving on additional melting and cleanup time. The main objective is to keep the chocolate in the de-crystallized state. This function is activated by depressing the overnight mode keypad 80. Rotation of the bowl stops and holds the pool of chocolate at 95 F. (35.0 C.). The overnight mode is de-activated by pressing the re-set button 93.

If custom heat settings different from the factory default pre-sets are desired and in either the melt or temper mode, the +heat 82 and −heat 83 keypads are actuated. While in the desired mode, depression of one of the heat keypads will effectuate incremental temperature changes. Holding the keypad down will result in a rapid scroll. Degree of change is displayed in the window.

The machine's menu save feature allows the user to save custom temper temperatures for each chocolate type for "special blend" recipes or to simply choose one's own temper set point. Once the desired temperature is set it can be stored and then recalled at later times over and over.

To set a desired temper set point the menu save button 85 is selected. The +heat or −heat button is pressed until the desired temper set is achieved. The custom setting is stored permanently within the memory of the machine unit until the user decides to change it by pressing the +heat or −heat keypad.

To recall the custom temper set point at a later date the operator selects the menu save keypad 85 before selecting the chocolate type. If the menu save button is not first actuated the default temper set points are activated.

The pause function allows the user to quickly pause the bowl rotation for a period of say 90 seconds while in the temper mode. The user presses the pause button 77. Bowl rotation stops and a pause clock will count down and upon reaching 00:00 bowl rotation resumes.

The auto pause feature allows a user to select custom pause settings while in the temper mode. Once selected, the custom pause loops between the desired pause setting (for example, starting at 2 minutes, with 1 minute intervals, up to 8 minutes) and a pre-set 2 minute automatic agitation cycle starts without having to reactivate the auto pause button.

The pause clock 79 appears in the display window. The user selects a pause setting by holding down the auto pause button (starting at 2:00) and scrolling through 8:00. Once the desired setting is selected the bowl will pause and the clock counts down to 0:00. At this point rotation of the bowl resumes and the clock starts the agitation countdown from 2:00. The previous setting starts over once the clock reaches 00:00.

The auto pause time can be adjusted by pressing and holding down the auto pause keypad again, or deactivated by pressing the button once.

The drip feed feature holds the chocolate temperature at 93 F. (33.8 C.) to allow for traditional drip-feeding methods. To activate the drip feed button 81 or keypad is pressed. The pool of chocolate is held at the temperature with normal bowl agitation. To deactivate the reset button 93 is pressed.

It should be obvious that changes, additions and omissions may be made in the details and arrangement without departing from the spirit and scope of the invention as hereinafter claimed.

What is claimed is:

1. A chocolate tempering machine comprising:
   a casing having a top surface with an opening and an interior;
   a bowl for holding chocolate, adapted to be inserted in the casing opening and having a lip;
   a baffle to be inserted within the bowl;
   means for causing relative rotation between the bowl and the baffle;
   means for heating the bowl to a given temperature to create a molten pool of chocolate within the bowl and to automatically maintain the pool at the given temperature;
   means for cooling the bowl;
   means for sensing the temperature of the molten pool of chocolate; and,
   digital, programmable means for controlling the heating means, cooling means and rotation means within the machine.

2. The machine of claim 1, including
   means for sensing relative humidity within the machine,
   means for setting pre-determined high and low relative humidity limits, and,
   means for providing a warning when a pre-determined relative humidity limit is reached.

3. The machine of claim 1, including
   means for sensing ambient air temperature within the machine,
   means for setting pre-determined high and low ambient temperature limits, and,
   means for providing a warning when a pre-determined machine ambient air temperature limit is reached.

4. The machine of claim 1 including a ring positioned between the top surface of the casing and the bowl lip to provide stability to the bowl while preventing contamination of the casing interior from the bowl.

5. The machine of claim 1 including a data port for interfacing with external computer programming units.

6. The machine of claim 1 including digital programmable means for selecting operating voltage for the machine.

7. The machine of claim 1 that includes means for making incremental changes in the temperature of the heat applied to the bowl by the heating means.

8. The machine of claim 1, including
   a clock display.

9. The chocolate tempering machine of claim 7, including
   means for providing an additional cooling cycle for the chocolate.

10. The machine of claim 1 including
    means for causing relative rotation between the between the bowl and the baffle and means for heating the bowl over extended periods of time; and,
    means for timing both the length of relative rotation and the heating of the bowl.

11. The machine of claim 1, including
    means for selecting a temperature and time cycle for the heating and cooling means for the heating and cooling of chocolate within the machine to form a recipe;
    means for storing a plurality of recipes to form a menu; and,
    means for recalling a recipe from the menu for later use.

* * * * *